(12) United States Patent
Haleluk

(10) Patent No.: US 9,197,273 B2
(45) Date of Patent: Nov. 24, 2015

(54) CASE FOR MOBILE COMMUNICATION DEVICE WITH FLASH AND CAMERA CONTROLS

(76) Inventor: Robert Haleluk, New York, NY (US)

( * ) Notice: Subject to any disclaimer, the term of this patent is extended or adjusted under 35 U.S.C. 154(b) by 157 days.

(21) Appl. No.: 13/461,606

(22) Filed: May 1, 2012

(65) Prior Publication Data

US 2012/0282977 A1    Nov. 8, 2012

Related U.S. Application Data

(60) Provisional application No. 61/482,987, filed on May 5, 2011.

(51) Int. Cl.
*H04M 1/00* (2006.01)
*H04B 1/3888* (2015.01)

(52) U.S. Cl.
CPC .................................. *H04B 1/3888* (2013.01)

(58) Field of Classification Search
CPC ............................ H04B 1/3888; H04N 5/2252
USPC ................ 455/556.1, 575.8, 572, 575.1, 558
See application file for complete search history.

(56) References Cited

U.S. PATENT DOCUMENTS

| | | | |
|---|---|---|---|
| 6,317,313 B1 * | 11/2001 | Mosgrove et al. | 361/679.3 |
| 7,782,610 B2 * | 8/2010 | Diebel et al. | 361/679.56 |
| 8,367,235 B2 * | 2/2013 | Huang | 429/96 |
| 8,385,974 B1 * | 2/2013 | Bishop | 455/556.1 |
| 8,390,255 B1 * | 3/2013 | Fathollahi | 320/115 |
| 8,483,758 B2 * | 7/2013 | Huang | 455/557 |
| 2007/0236180 A1 * | 10/2007 | Rodgers | 320/115 |
| 2008/0096620 A1 * | 4/2008 | Lee et al. | 455/575.8 |
| 2008/0132289 A1 * | 6/2008 | Wood et al. | 455/566 |
| 2009/0181729 A1 * | 7/2009 | Griffin et al. | 455/575.1 |
| 2012/0270599 A1 * | 10/2012 | Mori et al. | 455/556.1 |

OTHER PUBLICATIONS

Popa: The Magical Button for iPhone; MACGASM; www.macgasm.net (2012).
Kapok; Canopy; www.canopy.com (2012).
Beamer, Quirky iPhone Case With Built-in Flash; www.quirky.com (2012).

* cited by examiner

*Primary Examiner* — Sanh Phu
(74) *Attorney, Agent, or Firm* — John F. Vodopia

(57) ABSTRACT

A mobile device case is formed with a hollow case housing for receiving a mobile device and controlling a mobile device camera therein. The mobile device includes a case connector for electronically connecting the case to the mobile device at insertion of the mobile device into the hollow case housing and at least one camera control actuator for controlling operation of the mobile device camera, when the mobile device is present in the hollow case housing. The hollow case housing comprises a first housing section and a second housing section that comes together by respective tongue and groove elements to thereby encapsulate the mobile device.

18 Claims, 10 Drawing Sheets

CASE FOR MOBILE COMMUNICATION DEVICE WITH FLASH AND CAMERA CONTROLS

CROSS-REFERENCE TO RELATED APPLICATIONS

Figure 1:
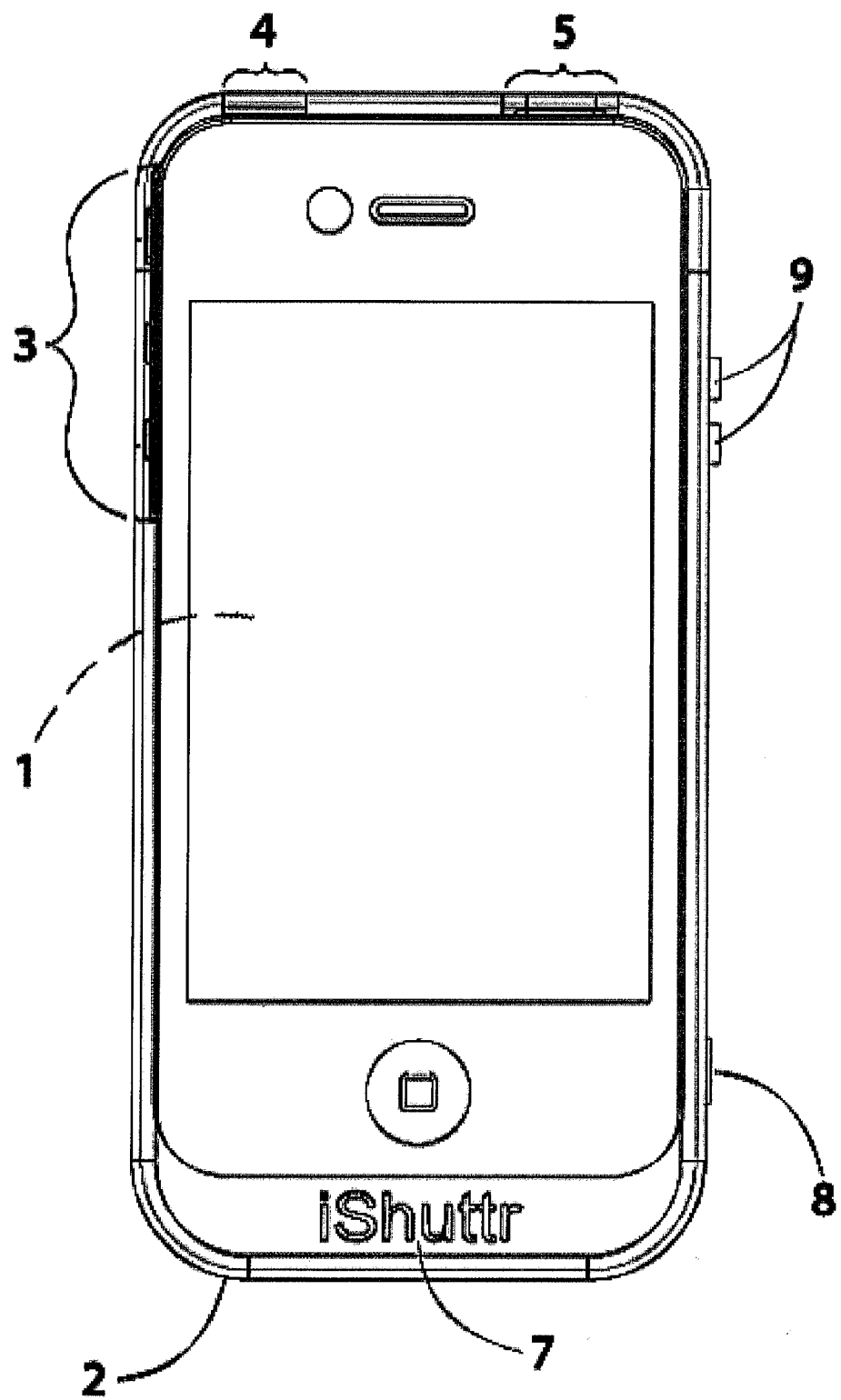

This application claims priority under 35 U.S.C. §119 from U.S. Provisional Patent Document No. 61/482,987, filed May 5, 2011, all of the contents of which are incorporated by reference herein.

BACKGROUND OF THE INVENTION

The present invention relates broadly to a case constructed to receive a mobile communication device (or mobile device) that includes a flash strobe and controls for controlling a camera within the mobile device in order to provide the case user with an experience of a point and shoot camera.

Known mobile devices include cameras for enhancing the experience of the mobile device user. Such phones, however, often lack the look and feel of a traditional camera and therefore detract from a user's experience in using the mobile device camera. In many cases, mobile phones are often smaller and have less of an ergonomic feel of a traditional camera, for example are very light weight and lack a means for gripping a mobile device in a way in which a traditional camera is known to be gripped while shooting pictures or video. For that matter, the camera controls normally found on a traditional camera are not found on a mobile device that includes a camera feature, or at least not in the relative position where such camera controls might be expected to be found.

As mobile devices are intended to be light weight, and efficiently use electrical power stored in batteries built into the mobile device, the mobile devices are not known to include flash devices to provide a flash of light to enhance picture quality, where necessary, due to the need for relative large amounts of electrical power to drive such flash devices.

SUMMARY OF THE INVENTION

The present invention presents a case constructed to receive a mobile device and including a flash and controls for controlling a camera within the mobile device in cooperation with the flash and method for using such case, which overcome the shortcomings of the known related arts.

Broadly, the inventive case is configured to receive any type of mobile device with a phone and control a camera found in the mobile device. The case includes a flash device, e.g., strobe flash, that is controlled in cooperation with operation of the camera that is part of the mobile device, preferably by a controller in the case (e.g., a made for iPhone™, made for iPod™, made for iPod™ (MFi) controller) that is coupled to a controller in the mobile device via a connector (e.g., a 30 pin connector) in the bottom of the case to which a complementary connector in the mobile device attaches upon insertion into the case. The case controller includes a memory, or the case includes a memory accessible to the case controller, which stores computer instructions for controlling the case required signal exchange with the mobile device to affect control of the mobile device camera. For that matter, the case controlled is preferably designed to interact with application programs running in the mobile device, for example, iPhone™ apps.

A battery compartment in the case holds at least one battery sufficient to drive the controller and flash device. The outer surface contour of the case is configured with or as a hand grip to provide the user with a "genuine" camera feel. Control actuators, preferably in the form of button actuators, control the shutter release and zoom controls (where available) in the mobile device camera. In flash mode, the case controller signals the camera (through the connection formed by the complementary connectors) to take a picture via the shutter control actuator to which the mobile's controller responds by sending a signal to the flash device back through the connector. In this way, the flash device and camera shutter may be synchronised so that the shutter does not open until the flash device is triggered.

In an embodiment, the invention provides a case for controlling a camera within a mobile device. The case includes a hollow case housing configured for receiving the mobile device therein, a case connector for electronically connecting the case to the mobile device at insertion of the mobile device into the hollow case housing and at least one camera control actuator for controlling operation of the mobile device camera, when the mobile device is present in the hollow case housing.

The at least one camera control actuator generates control signals that are coupled through the case connector to the mobile device camera, when the mobile device is present in the hollow case housing. Also, the case may include a case controller, wherein the at least one actuator generates case control signals that are processed by the case controller and wherein the case controller generates camera control signals that are coupled through the case connector to the mobile device camera, when the mobile device is present in the hollow case housing. For that matter, the at least one camera control actuator comprises any of the group consisting of an image capture switch, a zoom control switch, a flash control switch and a camera function activation switch.

Preferably, the case further comprises a flash strobe, wherein the flash strobe is actuated by the at least one camera control actuator and synchronised to exhibit a flash with opening of a shutter of the mobile device camera, when the mobile device is present in the hollow case housing. A flash controller manages flash parameters including synchronising the flash with the opening of the shutter of the mobile device camera. Alternatively, the flash controller that manages flash parameters, wherein the flash controller is coupled via the case connector to the mobile device camera, which synchronises the flash with the opening of the shutter of the mobile device camera, when the mobile device is present in the hollow case housing.

The case also includes a battery unit with a battery and a battery charging port for receiving a connector for recharging the battery. The battery unit further includes a battery status indicator mounted in the case housing. Cut-outs in the case housing position to allow exposure of and direct access to mobile device camera actuators, when the mobile device is present in the hollow case housing.

In another embodiment, a mobile device case is formed with a hollow case housing for receiving a mobile device and controlling a mobile device camera therein. The case comprises a case connector for electronically connecting the case to the mobile device at insertion of the mobile device into the hollow case housing, at least one camera control actuator for controlling operation of the mobile device camera, when the mobile device is present in the hollow case housing. The hollow case housing comprises first and second housing sections that connect with respective tongue and groove elements to form the hollow case housing.

The first housing section is formed with an ergonomic grip for improved case handling and with cut-out areas in order to allow access through the mobile device case of mobile device camera control actuators when the mobile device is present in the hollow case housing. One of the cut-out areas comprises a camera lens opening in the hollow case housing. The hollow case housing is formed with plastic or metal.

The first housing section includes a flash device that is controlled to flash synchronously with image capture by the mobile device camera, when the mobile device is present in the hollow case housing. The first housing section also includes a battery unit that supplies electrical power at least for the flash device and a USB port for allowing insertion of a USB connector to connect directly to a mobile device if present in the mobile device case.

BRIEF DESCRIPTION OF THE DRAWING FIGURES

Figure 2:
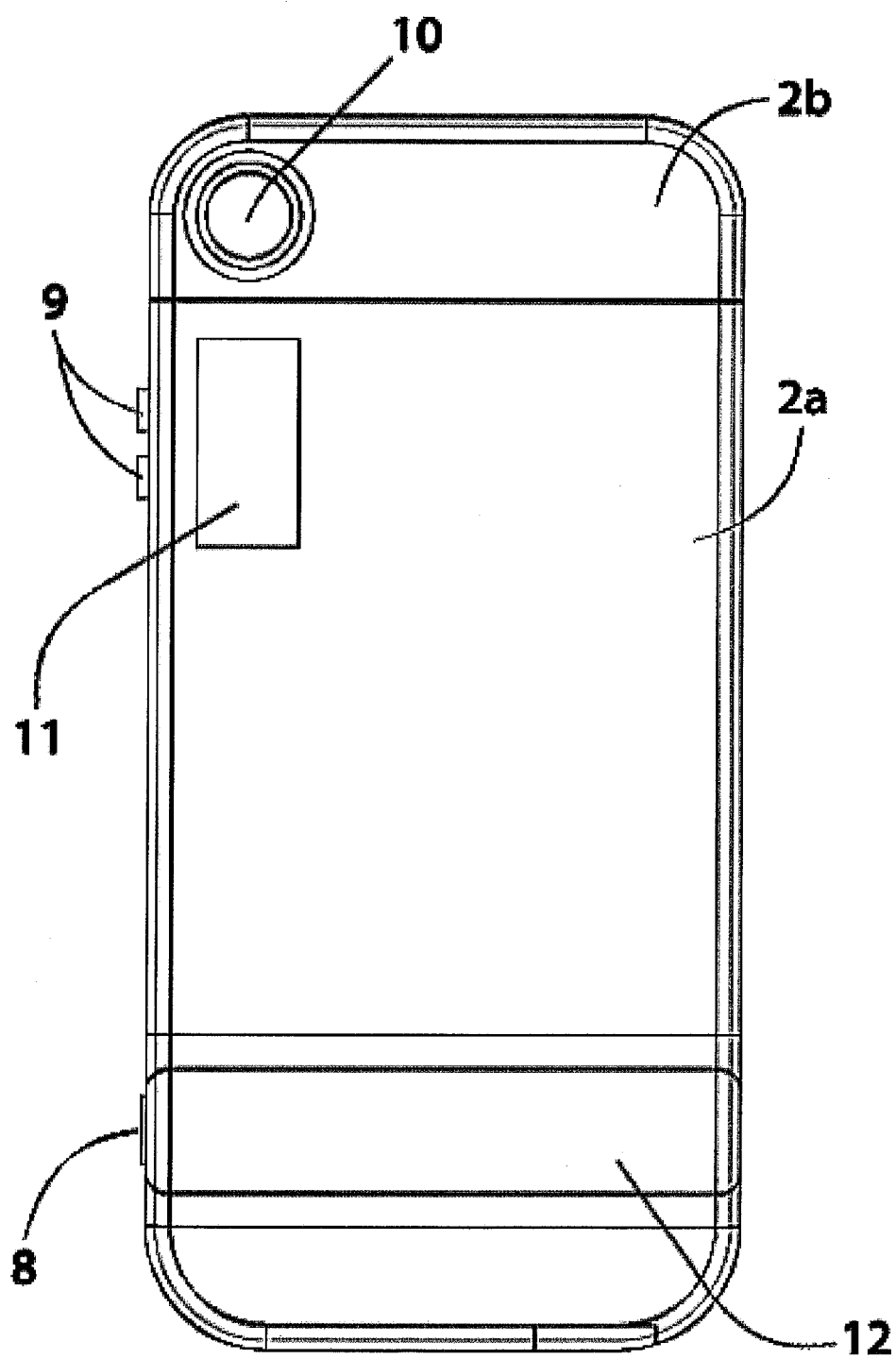
Figure 3:
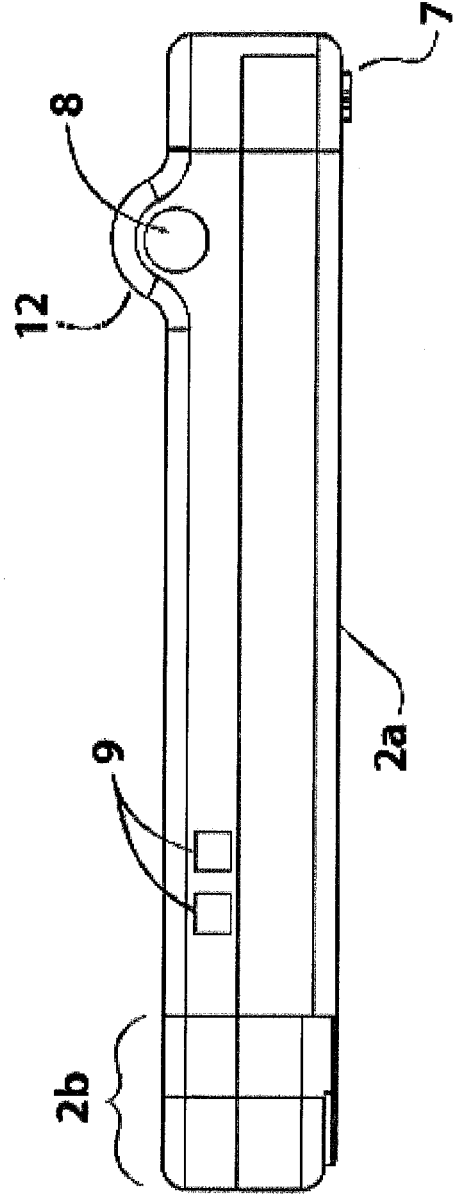
Figure 4:
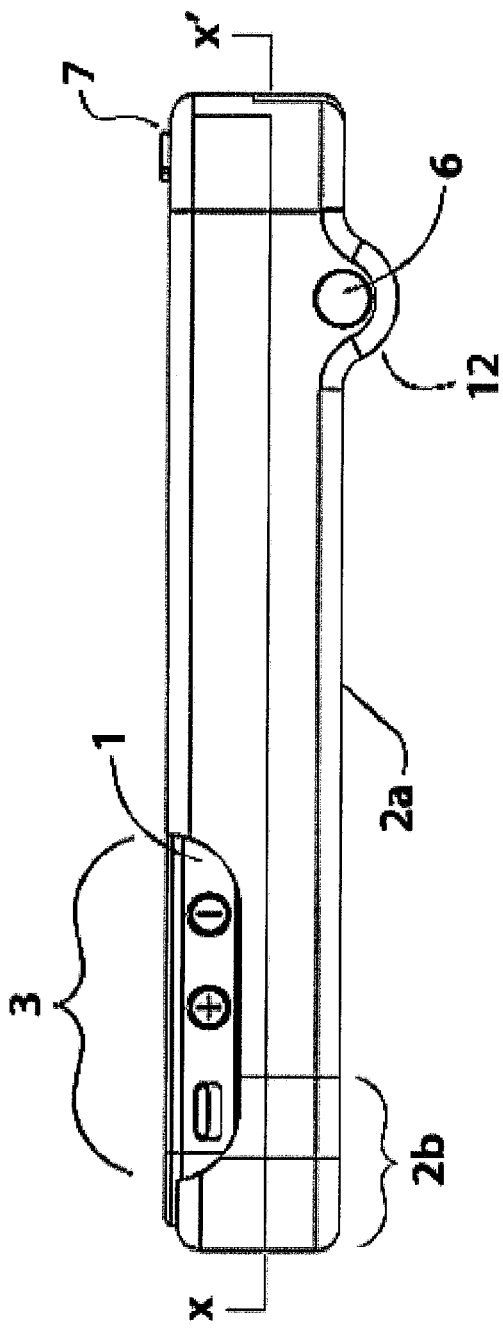
Figure 5:
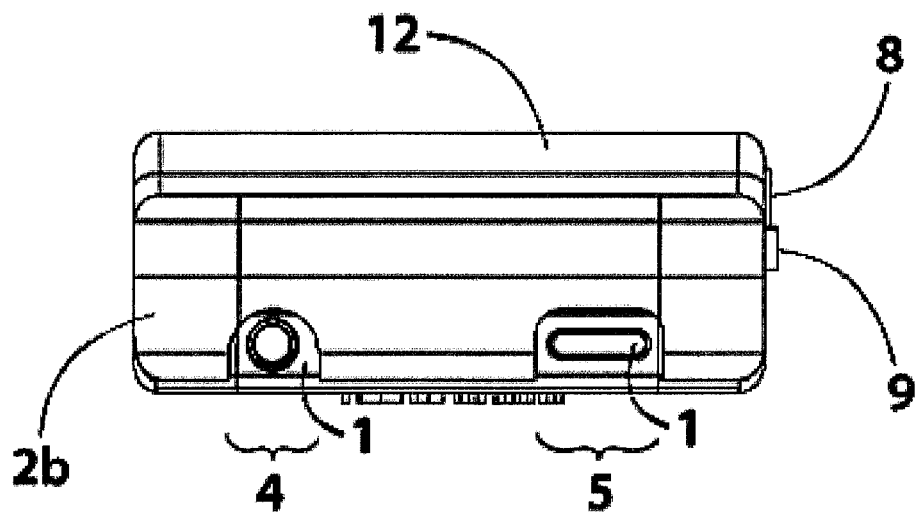
Figure 6:
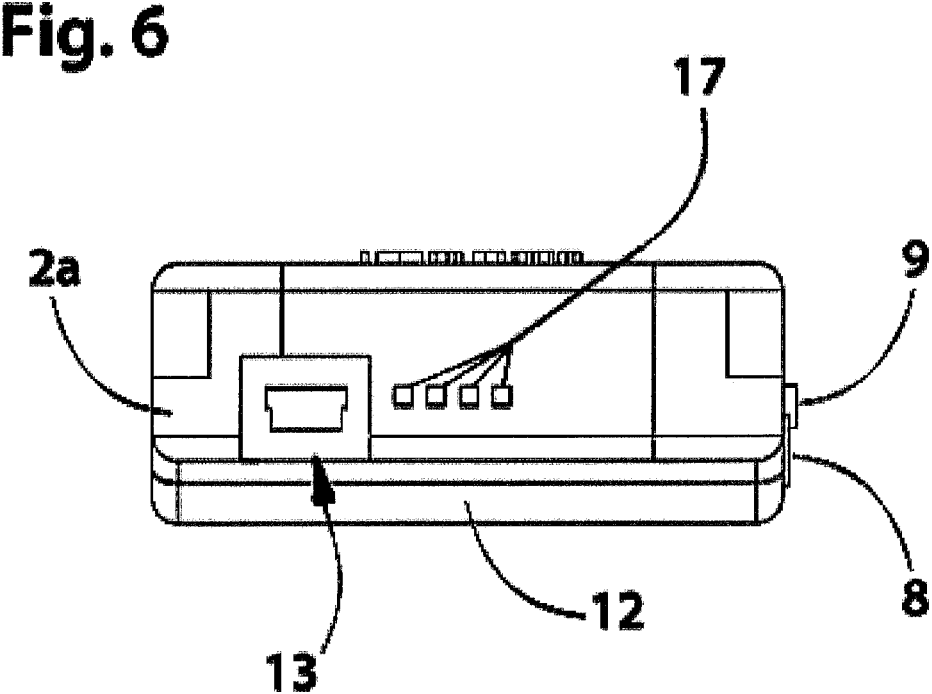
Figure 7:
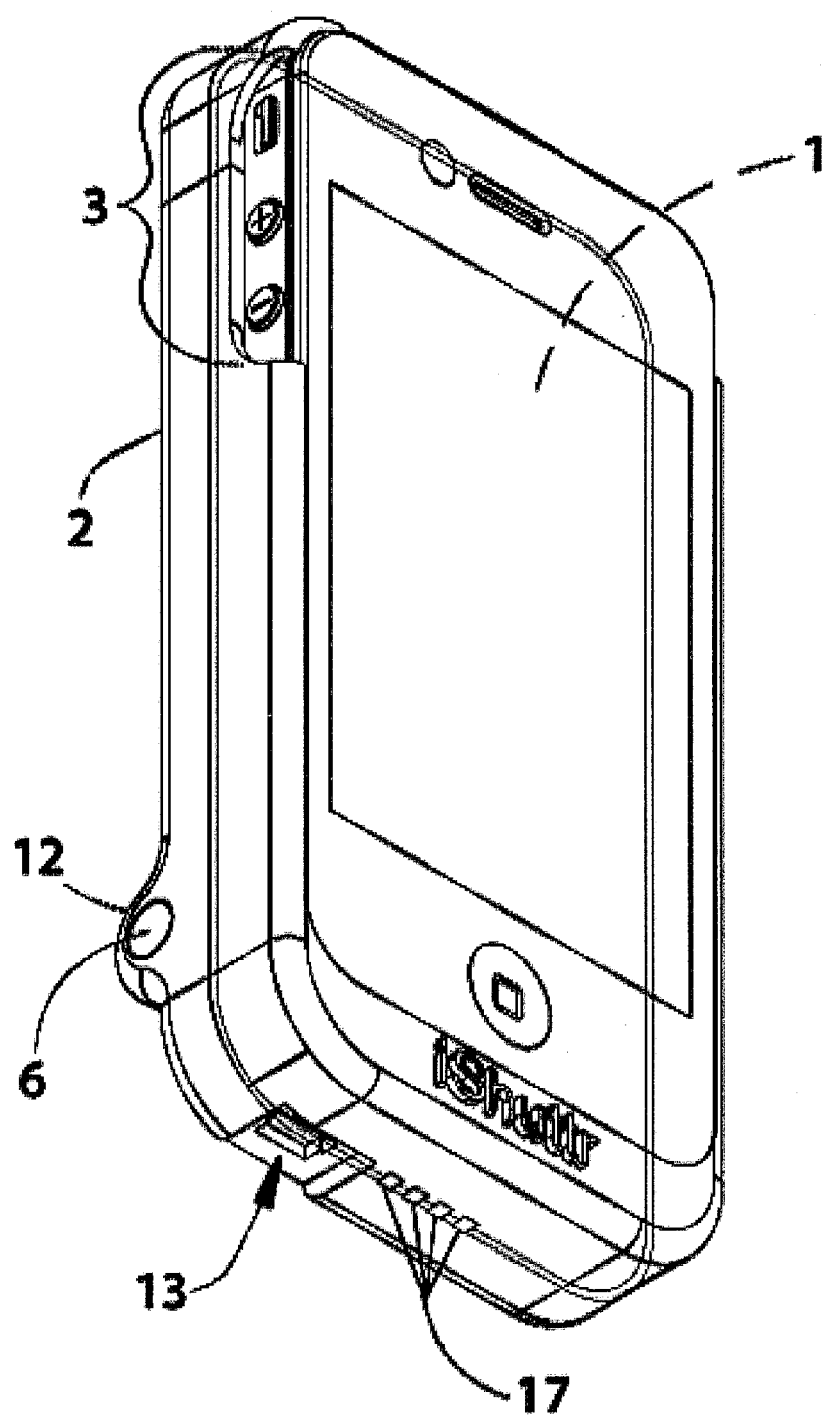
Figure 8:
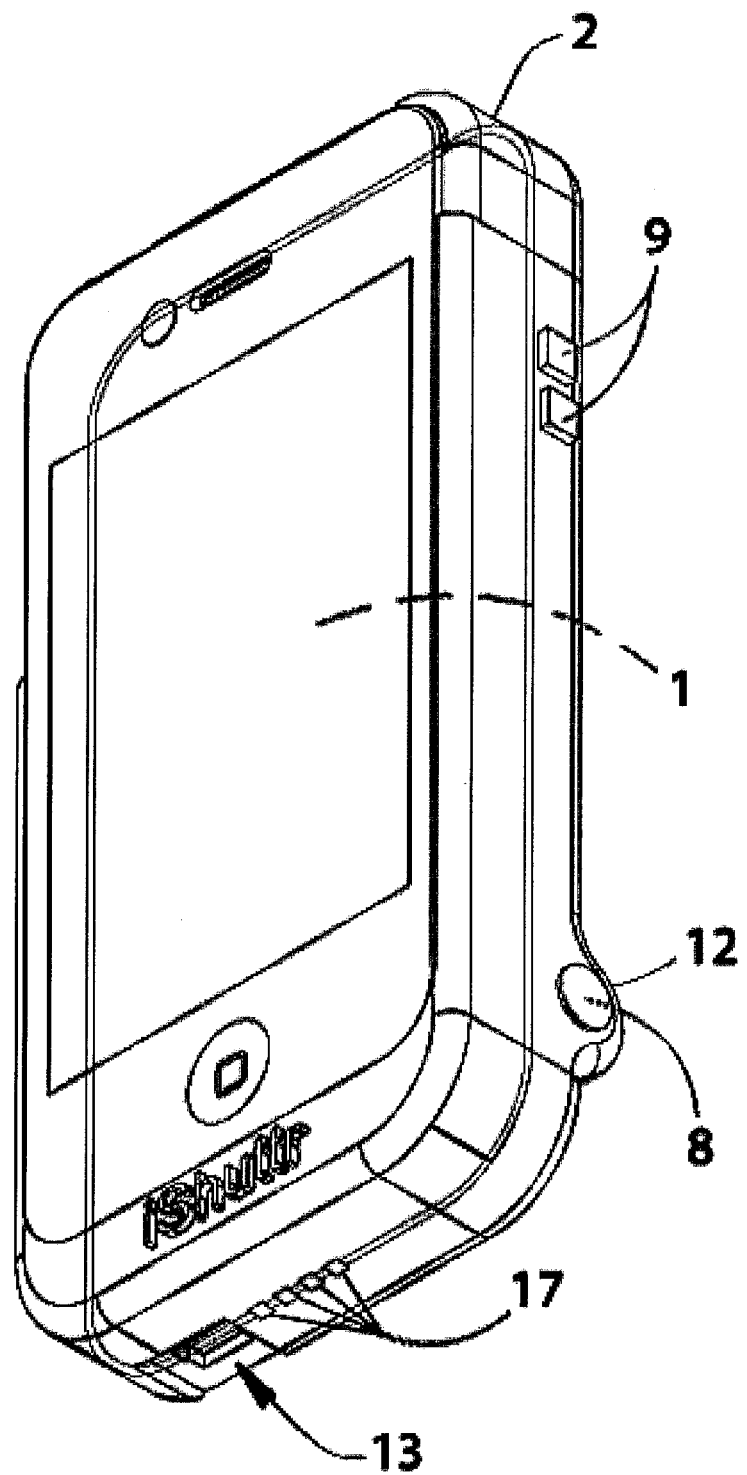
Figure 9:
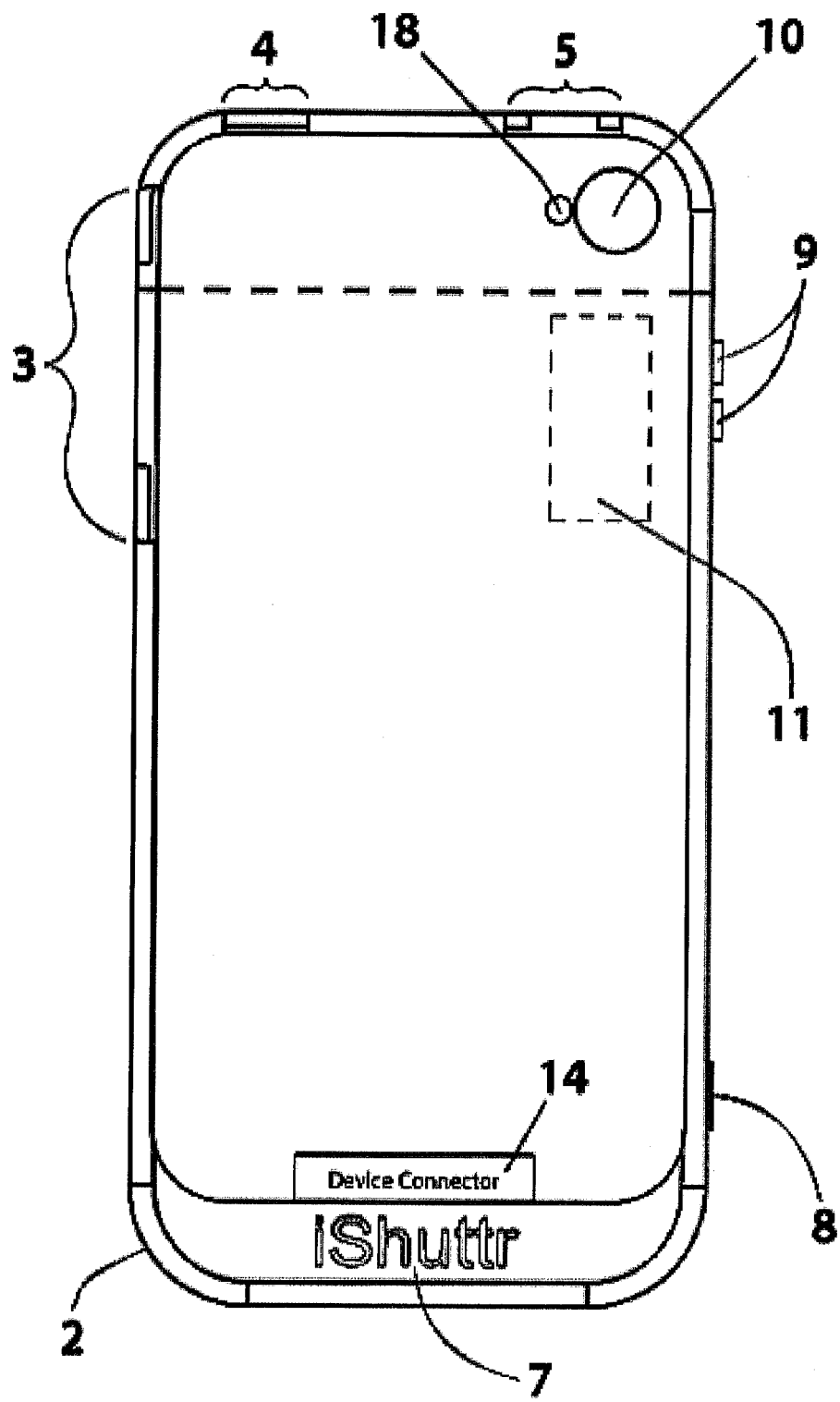
Figure 10:
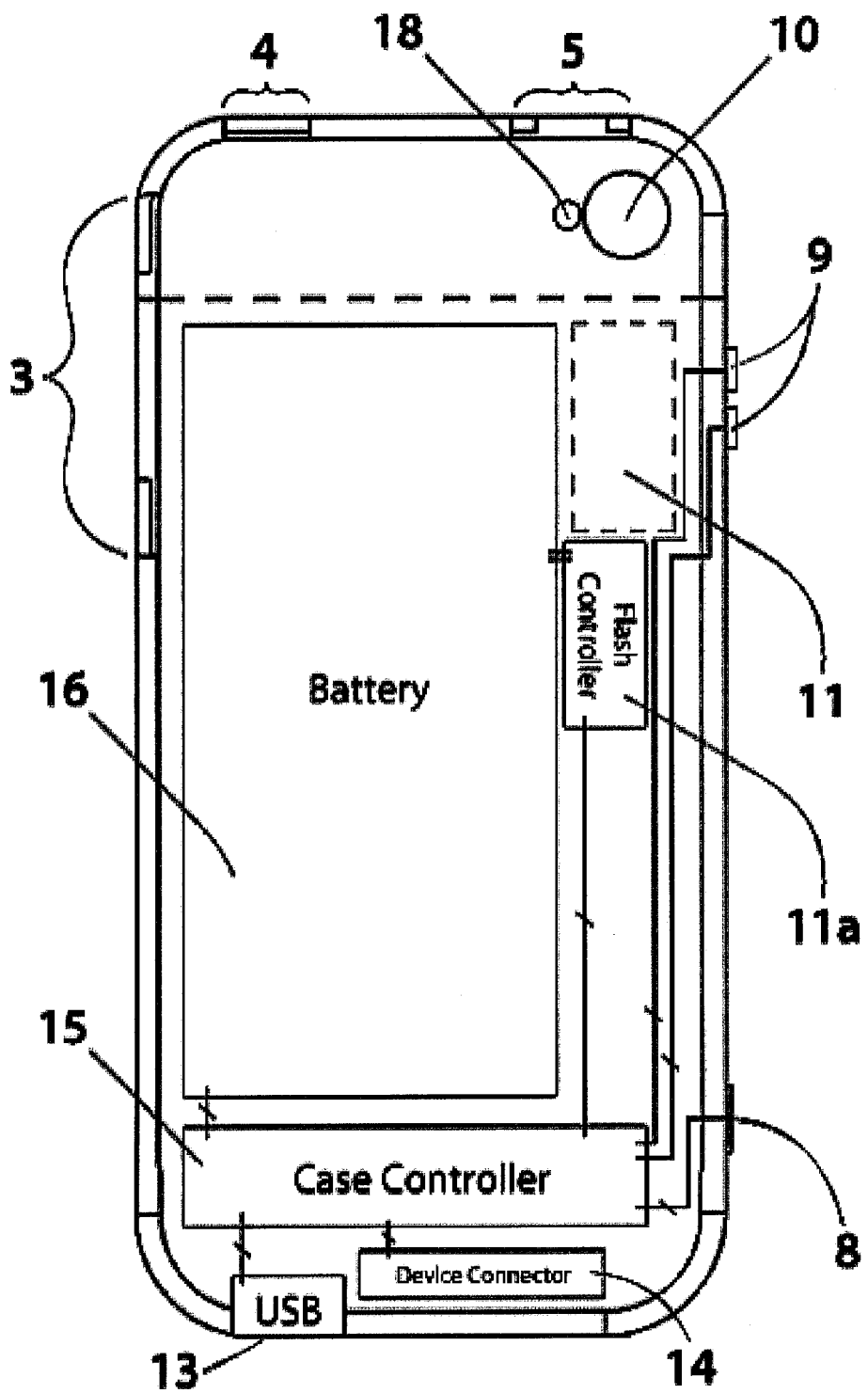
Figure 11:
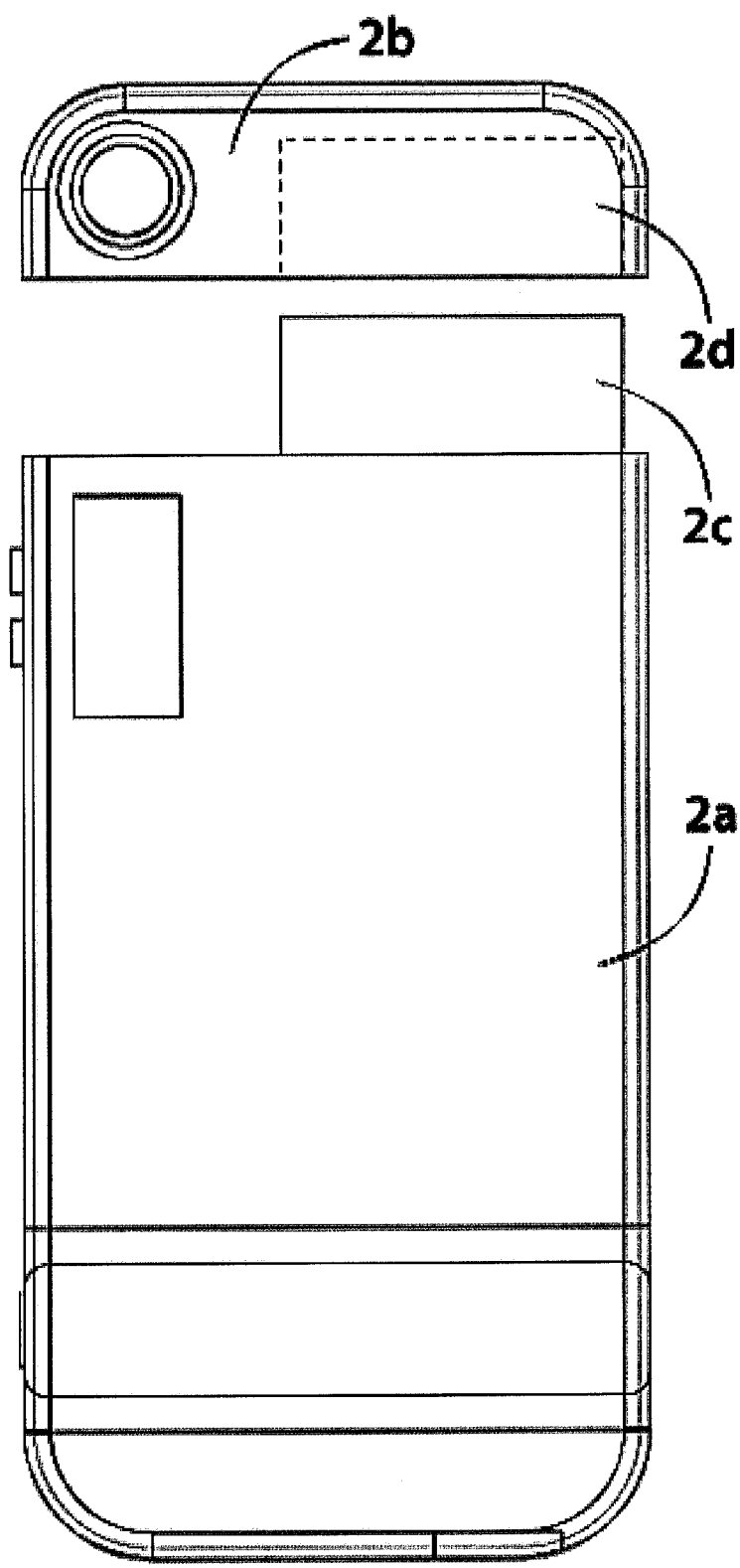
Figure 12:
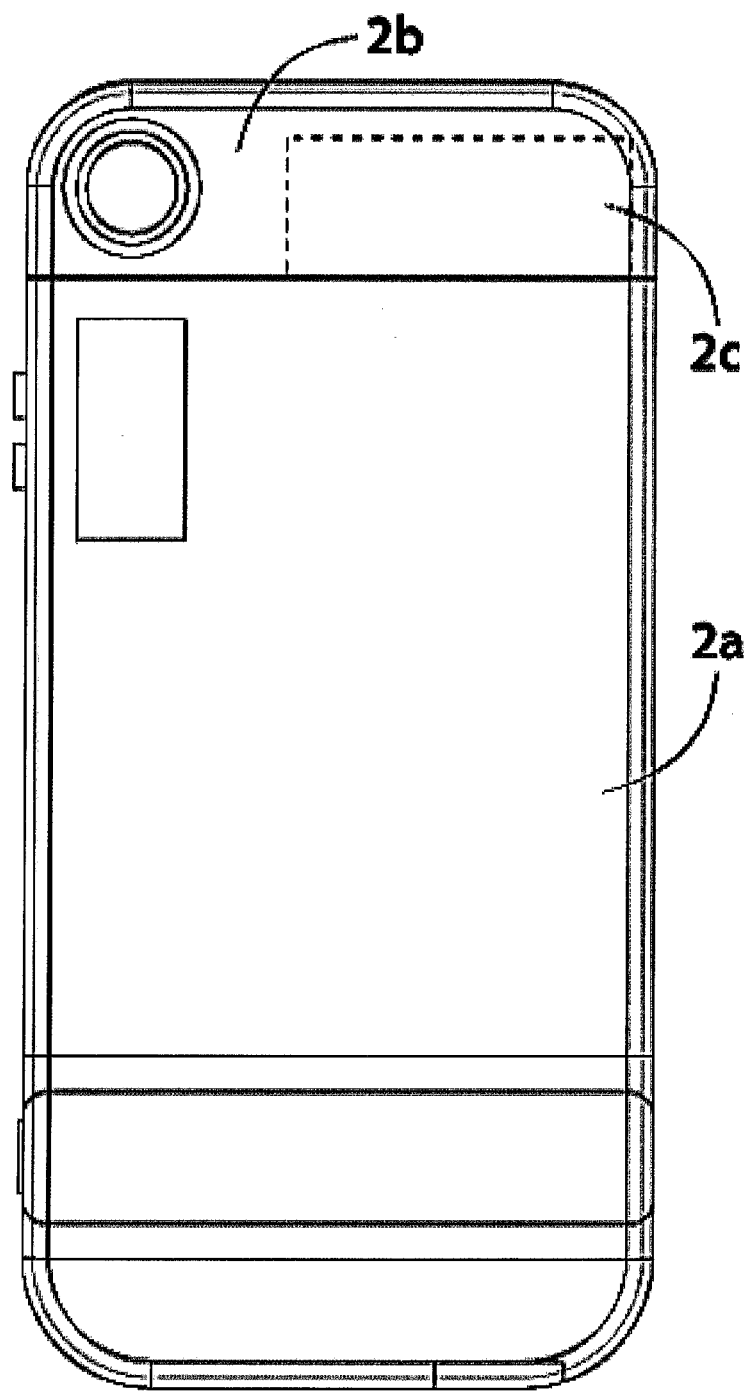

The present invention can best be understood in connection with the accompanying drawings. It is noted that the invention is not limited to the precise embodiments shown in drawings, in which:

FIG. 1 presents a front plan view of one embodiment of a case of the invention within configured for use, with a mobile device presently disposed therein;

FIG. 2 presents a rear plan view of the case depicted in FIG. 1;

FIG. 3 presents a right side plan view of the case depicted in FIG. 1;

FIG. 4 presents a left side plan view of the case depicted in FIG. 1, with a mobile device presently disposed therein;

FIG. 5 presents a top (side) plan view of the case depicted in FIG. 1, with a mobile device presently disposed therein;

FIG. 6 presents a bottom (side) plan view of the case depicted in FIG. 1;

FIG. 7 presents a left front perspective view of the case depicted in FIG. 1, with a mobile device presently disposed therein;

FIG. 8 presents a right front perspective view of the case depicted in FIG. 1, with a mobile device presently disposed therein;

FIG. 9 is presents a front plan view of the case depicted in FIG. 1, without the mobile device, in order to highlight the device connector;

FIG. 10 presents a frontal planar cutaway view of the FIG. 1 case, the cutaway plane corresponding to the line x-x' in FIG. 4;

FIG. 11 depicts the case in an arrangement where the first housing section is separated from the second housing section;

FIG. 12 presents the case in an arrangement where first and second housing sections are connected.

DETAILED DESCRIPTION OF THE INVENTION

The following is a detailed description of example embodiments of the invention depicted in the accompanying drawings. The example embodiments are in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The inventive case essentially turns a mobile device into a camera, with the look, feel, contour and operation of conventional point and shoot cameras.

FIGS. 1-11 depict the inventive case configured for use with an iPhone™. The embodiment configured for use with an iPhone™ is depicted for explanation purposes only, where the inventive case may be modified where necessary to accommodate any known mobile device without deviating from the scope and spirit of the invention.

FIGS. 1 and 2 show respective front and back plan views of the inventive case 2, within which an iPhone™ (mobile device) 1 has been inserted. The case 2 is preferably made of a light weight, durable plastic material, but could also be made from a metal material. A shutter release button 8 for actuating a mobile device camera and zoom in/zoom out controls 9 are included to control image capture and camera lens focus, when the mobile device 1 is present in the case 2 (described in greater detail below). Logo 7 is shown to identify the case by its commercial name, iShuttr™.

Several cut-outs are included in the device to allow for direct access to the mobile device controls. For example, a volume control(s) cut-out area 3 is included to provide access to mobile device (e.g., iPhone™) volume controls, when the mobile device 1 is present in the case 2. An audio port cut-out area 4 is included to provide access to an audio pin of the mobile device (e.g., iPhone™), when the mobile device 1 is present in the case 2. A power button area cut-out 5 is provided to provide access and direct control of a power button of the mobile device (e.g., iPhone™), when the mobile device 1 is present in the case 2. Parts of the iPhone™ 1 within the cut-out areas 3, 4, 5 are seen in FIGS. 4 and 6. The reader should note that the locations at which the various cut-out areas are arranged on the case 2 are positioned to accommodate or access various control button location on the housings of various mobile devices with which the case is configured for use, but which locations are not intended to be limiting. As known to the person of skill in the art, the cut-out area locations may be positioned where necessary to accommodate other mobile device designs without deviating from the scope and spirit of the invention.

The case includes a tripod mount 6, as clearly shown in FIGS. 4 and 7. Tripod mount 6 is configured for receiving a tripod connection. A camera lens opening 10, a flash strobe or device 11, with or without diffuser and hand grip 12 are included in the case 2. In one embodiment, the flash strobe or device 11 includes a xenon bulb and capacitor (not shown), and flash controller 11A. The camera lens opening 10 provides an opening in the back of the case 2 that allows light to pass into the mobile device camera lens when the shutter is opened to capture an image. The flash device or strobe 11 is activated in response to a signal generated by a camera control actuator or camera shutter button 8 (described in detail below).

The ergonomic hand grip 12 preferably extends vertically out of the surface of the back of the case 2, as a half cylinder. A radius of the half-cylinder defines the maximum vertical extent of the grip with respect to the substantially parallel back case surface. The grip extends from one case side to the other (see FIGS. 3 and 4), providing the user with contour that facilitates grasping not found in known mobile devices. Preferably, the threaded tripods mount 6 is disposed at least partially in the grip 12 on the left side, as shown in FIG. 4, and the shutter release button 8 is disposed at least partially in the grip 12 on the right side, as shown in FIG. 3. The mount 6 fits any tripod with a ¼-20" threaded pattern.

A USB charging/sync port 13, a case connector 14, a case controller 15 (e.g., a micro-controller other programmable controller), a battery unit 16, battery status indicator 17 and a charging port 18, also are included and described in detail below with reference to FIGS. 9 and 10. FIG. 10 is a plan cutaway view of the case 2, without a mobile device in the hollow case housing. The cutaway is planar with respect to a line x-x' as seen in FIG. 4.

The case 2 is formed of two parts or sections, first housing section 2a, and second housing section 2b. The first housing section 2a includes a tongue piece 2c that is inserted in a groove 2d in the second housing section 2b, as shown in FIG. 11. The majority of the components of the case 2 are positioned in the first housing section 2a. FIG. 12 depicts the case 2 wherein the first and second housing sections 2a, 2b are connected. While tongue 2c is shown n shadow in FIG. 12, groove 2d is not shown. Please note that while tongue 2c and groove 2d are shown in FIGS. 11 and 12 in respective first housing section 2a and second housing section 2b, the positions of the tongue and groove may be reversed without deviating from the scope and spirit of the invention.

Shutter release button 8 effects image and video acquisition by the camera in the mobile device 1. Actuating the shutter release button 8 generates a signal that is coupled to the mobile device camera via the case connector 14, when the mobile device 1 is present in the case. The shutter release button 8 preferably displays a certain tension or resistance to pressing in order to give the user an impression that he/she is actuating a traditional camera. Most preferably, the position on the shutter release button 8 mimics the sound of a traditional camera shutter actuation mechanism. Zoom-in/zoom-out controls 9 may comprise separate buttons of a rocker type switch to generate at least one signal to control the camera's zoom feature, where available, both with images and video acquisition. By depressing the at least one button 9, one or more signals are generated and for zooming in or zooming out, and coupled through the connector 14 to the mobile device 1 (and camera therein). The length of time that the depressing pressure is applied defines the amount of positive and negative zoom, respectively.

The respective signals generated by the shutter release button 8 and zoom in/out button controls (or buttons) 9 are provided as inputs to the micro-controller 16. The micro-controller 16 senses the signal affected by the respective press or actuation, including the amount of time for which a button is pressed, and generates control signals for transfer to the camera in the mobile device 1 via connector 14. The signals then travel though the mobile-device's bus to its controller (not shown), or directly to the mobile device camera controller (not shown), depending on the particular design of the mobile device 1. Preferably, the controller in the mobile device 1 generates a flash control signal in response to the shutter control signal received via case connector 14. The flash control signal generated in the mobile device is sent back through case connector 14 to the case controller 15, which controls the flash device 11 via flash controller 11A. The flash control signal effects coordination of the flash with the acquisition of the image, preferably in accordance with the mobile device software.

Since the iPhone (mobile device) 1 can shoot video too, the case 2 is configured to work in cooperation with those mobile device controls as well as still shot camera controls. That is, the zoom in/out controls 9 and shutter release button 8 are able to function to control the corresponding the video functionality in the mobile device, addition to its photo functionality. As a matter of fact, the shutter release button 8 automatically turns into a record button when the mobile device is first put into video mode. The shutter release button 8 also can be used to take pictures while recording video, a quick tap of the shutter release button will take a picture while the video is recording and a tap-and-hold tells the video to start/stop recording.

In one embodiment, coordination of the flash with the mobile device camera is not required. Therein, the case controller implements the timing necessary to synchronise the flash control signal with the actuation of the mobile device camera shutter. Alternatively, the flash control signal may be wired from case connector 14 (on the case side) to the flash controller directly, bypassing the case controller 15. Shutter release button 8 and zoom in/out button (or buttons) 9 may be wired directly to the connector 14 (on the case side), bypassing case controller 15. In one embodiment, the case does not include a case controller 15, wherein these shutter control and zoom-in/zoom-out signals are wired directly to the case connector 14, from which they are available to the mobile device circuitry.

The shutter release button 8 and zoom in/out controls (or buttons) 9 are shown hardwired to case controller 16 in FIG. 9, which and respective pins on the case side of connector 14. Battery unit 16 (e.g., a LiPo battery pack) is shown connected to the case controller 15, the flash strobe or device 11, a battery status indicator 17 and battery unit charging port 18. The battery unit 16 includes a battery (not shown) and maintains any case 2 power requirements. Charging port 18 is included for charging the battery unit 16 directly, where a USB port 13 is included in case 2 for charging and syncing the mobile device 1 while inserted within (encapsulated by) the case 2.

When the shutter release button 8 is pressed on the case 2, the signal is transferred to the mobile device 1, wherein the dedicated camera software therein sends a signal to the external flash to effect firing at the proper time so that light is generated at the same instant that the shutter opens. The flash strobe may be programmed at the controller 15 to achieve different intensity levels, for different lighting conditions.

Case users separate two halves (the first housing section 2a and the second housing section 2b), insert the mobile device 1 into the hollow part of the first housing section 2a and reconnect the two housing sections to encapsulate the mobile device 1. Pressing the two housing sections effects a connection of the case connector 14 with a complementary connector of the mobile device 1, effecting a coupling between the case electronics and the phone electronics. The case shutter release button (mobile device camera control) 8 and zoom in/out controls (or buttons) 9 are operational as soon as the connection at connector 14 is made with enclosure of the first and second case housings or parts about a mobile device.

The inventive case is not limited to photographic or video applications. The external buttons, switches or actuators may be programmed to respond to or affect any functionality known to the skilled artisan. For example, the invention may be configured for use as a medical device case that allows medial practitioners to shine light emitting diodes (LEDs) onto a subject while concurrently effect other controls. These other controls include but are not limited to households, lamps, automobiles or other transportation devices, toys medical and/or other related devices.

In addition to the physical description of the case 2, as described above, a different aspect of the invention includes a computer-implemented method for performing the above described method for controlling the mobile device camera's operation. As an example, this method may be implemented in the particular environment discussed above, for example, by operating a controller of computer controller, as embodied by a digital data processing device, to execute a sequence of machine-readable instructions. These instructions may reside in various types of signal-bearing storage media, either in case controller 15 or attached thereto.

Thus, this aspect of the present invention is directed to a programmed product, comprising signal-bearing storage media tangibly embodying a program of machine-readable instructions executable by the case controller and hardware above, to perform the method of the invention. This signal-bearing storage media may include, for example, a RAM contained within the case controller 15, as represented by the fast-access storage for example. Alternatively, the instructions may be contained in another signal-bearing storage media, such as a USB travel drive, directly or indirectly accessible by the case controller. Whether contained in the USB travel drive, the case controller, or elsewhere, the instructions may be stored on a variety of machine-readable data storage media, as known to a person of ordinary skill in the art.

The following list of reference signs of various elements mentioned above is included (as follows), for ease of explanation:

1 iPhone™ (mobile device)
2 case
2a first housing section
2b second housing section
2c tongue
2d groove
3 volume control(s) cut-out area
4 audio port cut-out area
5 power button area cut-out
6 tripod mount
7 Logo
8 shutter release button
9 zoom in/zoom out controls
10 camera lens opening
11 flash strobe or device
11a flash controller
12 hand grip
13 USB charging/sync port
14 case connector
15 case controller
16 battery unit
17 battery status indicator
18 charging port In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

What is claimed is:

1. A case for controlling a camera within a mobile device, comprising:
   a hollow case housing configured for receiving the mobile device therein;
   a case connector for electronically connecting the case to the mobile device at insertion of the mobile device into the hollow case housing;
   at least one camera control actuator for controlling operation of the mobile device camera, when the mobile device is present in the hollow case housing; and
   a case controller;
   wherein the at least one camera control actuator generates case control signals that are processed by the case controller to responsively generate camera control signals that are coupled through the case connector to the mobile device camera, when the mobile device is present in the hollow case housing.

2. The case as set forth in claim 1, wherein the at least one camera control actuator generates control signals that are coupled through the case connector to the mobile device camera, when the mobile device is present in the hollow case housing.

3. The case as set forth in claim 1, wherein the at least one camera control actuator comprises any of the group consisting of an image capture switch, a zoom control switch, a flash control switch and a camera function activation switch.

4. The case as set forth in claim 2, further comprising a flash strobe.

5. The case as set forth in claim 4, wherein the flash strobe is actuated by the at least one camera control actuator and synchronized to exhibit a flash with opening of a shutter of the mobile device camera, when the mobile device is present in the hollow case housing.

6. The case as set forth in claim 5, further comprising a flash controller that manages flash parameters including synchronizing the flash with the opening of the shutter of the mobile device camera.

7. The case as set forth in claim 5, further comprising a flash controller that manages flash parameters, wherein the flash controller is coupled via the case connector to the mobile device camera, which synchronizes the flash with the opening of the shutter of the mobile device camera, when the mobile device is present in the hollow case housing.

8. The case as set forth in claim 1, further comprising a battery unit including a battery and a battery charging port for receiving a connector for recharging the battery.

9. The case as set forth in claim 8, wherein the battery unit further includes a battery status indicator mounted in the case housing.

10. The case as set forth in claim 1, further comprising cutouts in the case housing position to allow exposure of and direct access to mobile device camera actuators, when the mobile device is present in the hollow case housing.

11. A mobile device case formed with a hollow case housing for receiving a mobile device and controlling a mobile device camera therein, the case comprising:
    a case connector for electronically connecting the case to the mobile device at insertion of the mobile device into the hollow case housing; and
    at least one camera control actuator for controlling operation of the mobile device camera by generating a control signal that is coupled through the case connector to the mobile device, when the mobile device is present in the hollow case housing; and
    wherein the hollow case housing comprises first and second housing sections that connect with respective tongue and groove elements to form the hollow case housing.

12. The mobile device case as set forth in claim 11, wherein the first housing section is formed with an ergonomic grip for improved case handling.

13. The mobile device case as set forth in claim 11, wherein the first housing section is formed with cut-out areas in order to allow access through the mobile device case of mobile device camera control actuators when the mobile device is present in the hollow case housing.

14. The mobile device case as set forth in claim 13, wherein one of the cut-out areas comprises a camera lens opening in the hollow case housing.

15. The mobile device case as set forth in claim 13, wherein the hollow case housing is formed with plastic or metal.

16. The mobile device case as set forth in claim 11, wherein the first housing section includes a flash device that is controlled to flash synchronously with image capture by the mobile device camera, when the mobile device is present in the hollow case housing.

17. The mobile device case as set forth in claim 13, wherein the first housing section includes a battery unit that supplies electrical power at least for the flash device.

18. A mobile device case formed with a hollow case housing for receiving a mobile device and controlling a mobile device camera therein, the case comprising:
- a case connector for electronically connecting the case to the mobile device at insertion of the mobile device into the hollow case housing; and
- at least one camera control actuator for controlling operation of the mobile device camera, when the mobile device is present in the hollow case housing;
- wherein the hollow case housing comprises first and second housing sections that connect with respective tongue and groove elements to form the hollow case housing; and
- wherein the first housing section is formed with cut-out areas that allow access through the mobile device case of mobile device camera control actuators when a mobile device is present in the hollow case housing and with a USB port for insertion of a USB connector to connect directly to a mobile device if present in the mobile device case.

\* \* \* \* \*